A. B. CRAWFORD.
Clover Huller.

No. 3,867.

Patented Dec. 31, 1844.

UNITED STATES PATENT OFFICE.

A. B. CRAWFORD, OF WOOSTER, OHIO.

CLOVER-HULLING MACHINE.

Specification of Letters Patent No. 3,867, dated December 31, 1844.

*To all whom it may concern:*

Be it known that I, A. B. CRAWFORD, of Wooster, in the county of Wayne and State of Ohio, have invented a new and Improved Clover Hulling and Cleaning Machine; and I do hereby declare that the following is a full, clear, and exact description thereof, reference being had to the accompanying drawing, in which—

Figure 1:
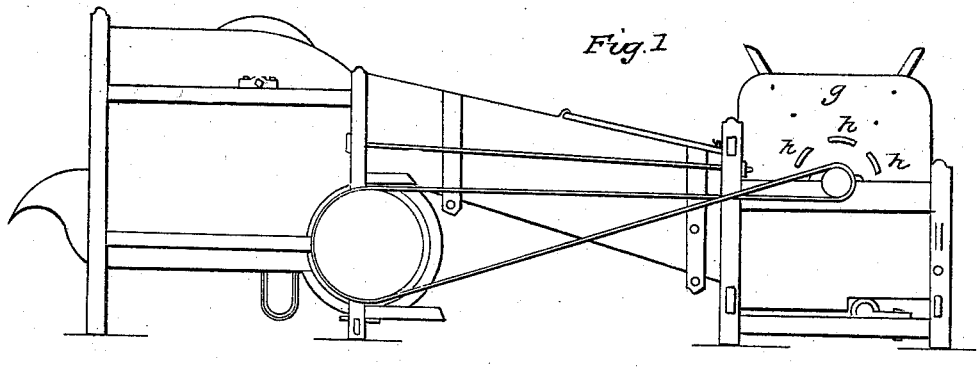
Figure 2:
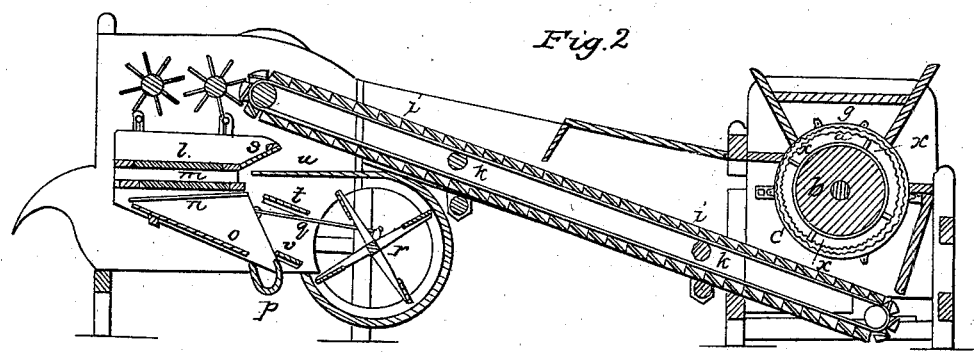
Figure 3:
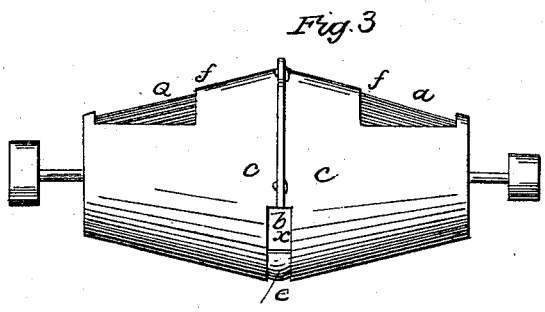
Figure 4:
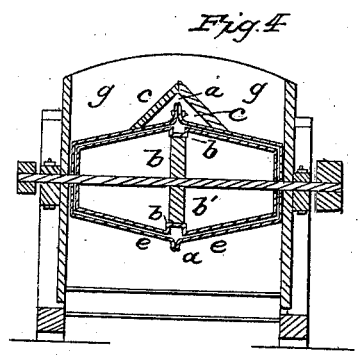

Figure 1, represents a longitudinal elevation; Fig. 2, a section longitudinally and vertically through the machine; Fig. 3, section of the beater or rubber in the case detached; Fig. 4, section through the rubber and case.

The object of this invention is to rub out clover seed and clean it all at one operation, by carrying it only once through the machine; its construction is as follows, viz: The rubber $a$, is a double truncated cone, the bases of which are toward the center; there is a space or groove $b$ between the bases filled, by a short cylinder $b'$ of smaller diameter from the periphery of which project fans $x$, that extend out to the same diameter as the bases of the cones and extending from one to the other, (the cylinder $b$, being smaller). The surface of the cones can be of sheet iron punched, or cast iron fluted, the latter I prefer, and it is so represented in the drawing (see Fig. 2). The inside of the concave is of a similar form to the rubber, and is also fluted in the same way; it is formed in two parts connected at the center; between these two parts there is a ring of wood $d$; by means of this form of construction the two ends of the concave can be brought nearer together as the machine wears, simply by reducing the thickness of the wooden ring $d$. At the center opposite the fans above named, there is an opening in the concave on one side at $e$, (see Fig. 3,) through which the seed makes its exit. At each end on top are openings $f$, by which the seed is fed into the machine from the hopper $g$. In the ends of the concave $c$, are apertures $h$, (see Fig. 1,) near to, and parallel with the circumference, on the upper half thereof; these admit air between the concave and rubber, and expedite the operation; the fans at the center, as well as the conical shape of the rubber facilitating the operation, and circulation of the air.

The seed is discharged onto an endless apron $i$, $i$, having buckets formed thereon by slats, similar to many carriers now in use; it runs over octagonal rollers $k$, by means of which it is shaken as it ascends, and by said apron the seed is conveyed to the fan and emptied onto a screen $l$, formed of slats like a Venetian blind, the slats slanting down and inward, toward the principal blast. Under this, there is another screen of similar construction $m$, and below is a common clover sieve $n$, the end of which next the fan is a little elevated; a board $o$, removes the seed from this sieve, and conducts it into the shoe or spout $p$. These are all attached to the shaking shoe that is moved by a connecting rod $q$, which connects it with a crank on the fan shaft $r$. The fan gives an over blast which is guided to the shaking shoe between the screens $l$, and $m$. It is directed somewhat downward by an inclined board $s$, in the shaking shoe. There is a narrow stationary board $t$ under the one that extends from the top of the concave case of the fan horizontally forward to the shoe which is lettered $u$. This board $t$ inclines a little, so as slightly to compress the blast at that point; below this and parallel with it is still another board $v$, about the same width as $t$, which serves to direct a current of air up under the sieve $n$. By means of these directing boards, I am enabled to clean the seed at one operation, which could not otherwise be done.

To change this machine to thresh and clean wheat it is only necessary to take out the rubber and concave, and substitute a threshing cylinder in the same boxes in the frame, and place under it a concave, all of any of the usual constructions and an addition of two rollers at the upper end of the endless apron, as shown in the section Fig. 2, by red lines.

Having thus fully described my improvements what I claim therein as my invention and desire to secure by Letters Patent is—

1. Contructing the rubber and concave substantially in the manner set forth; the seed being received in at the two ends, and, together with a current of air discharged at the center.

2. I also claim the combination of the screens $l$ and $m$, with the sieve $n$ in the shaking shoe in the manner and for the purpose set forth and in combination therewith the directing wind boards for the purposes above described.

A. B. CRAWFORD.

Witnesses:
 J. J. GREENOUGH,
 RICHD. KEY WATTS.